March 14, 1939. M. DE FALCO 2,150,715
ONE-WAY CLUTCH MECHANISM
Filed July 10, 1937
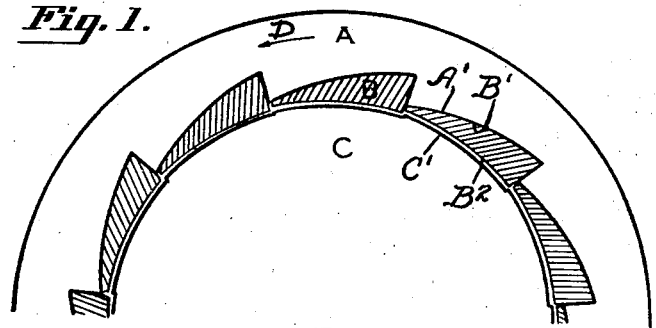
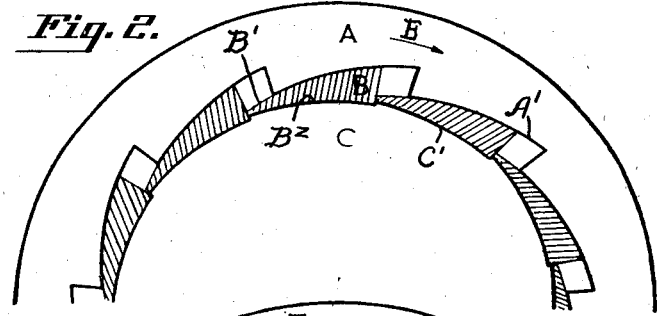
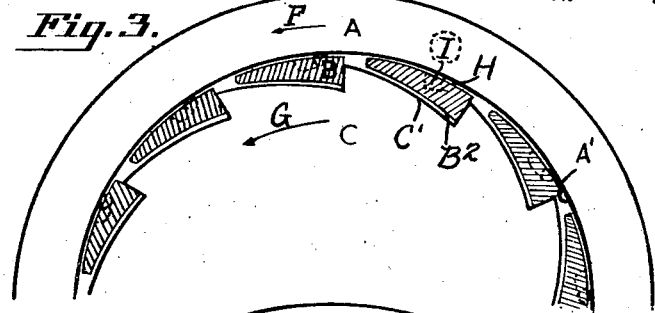
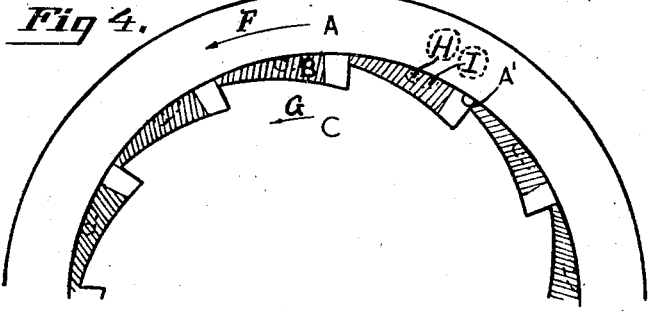
Inventor
MARIO DE FALCO
Attorney Patented Mar. 14, 1939

2,150,715

UNITED STATES PATENT OFFICE 2,150,715

ONE-WAY CLUTCH MECHANISM

Mario de Falco, Rome, Italy

Application July 10, 1937, Serial No. 152,889
In Italy July 27, 1936

7 Claims. (Cl. 192—45.1)

This invention relates to mechanism allowing relative movement of two members in one direction while movement in the other direction is prevented by means of frictional forces. More particularly, the invention relates to one-way clutch mechanisms and to wedges capable of use therein.

The generation of the frictional forces preventing movement is generally effected by the exertion of appreciable pressures (in general of the order of ten times as great as the forces themselves), which entails enormous wear of the surfaces through which the forces are applied, unless such surfaces are amply proportioned.

One object of the present invention is to provide a one-way clutch mechanism in which large driving or braking torques can be transmitted without undue wear.

Another object of the invention is to provide a one-way clutch mechanism having surface to surface engagement between the parts thereof.

Another object of the invention is to provide an improved wedging element for use between the coaxial members or shafts of a one-way clutch mechanism.

Another object of the invention is to provide a curviform wedge particularly adapted for use in a one-way clutch mechanism.

I have found that the correct proportioning of the force-applying surfaces can be realized only if, in place of contacts between points and surfaces, or lines and surfaces, there is substituted the most perfect contact possible between surface and surface and this surface to surface contact must be maintained even if the surfaces shift with respect to each other. I have found that this requirement is met by the utilization of cylindrical surfaces, having as directrix the logarithmic spiral defined by Descartes as the curve representing the uniformly inclined plane, and therefore the wedge.

Other objects and advantages of the invention will be apparent from the embodiments thereof illustrated in the accompanying drawing, in which:

Figure 1 is a diagrammatic view showing one form of one-way clutch mechanism having the curviform wedge members of the invention; the parts being in unlocked or free position;

Figure 2 is a similar view of the mechanism of Figure 1, but with the parts in locked position;

Figures 3 and 4 are diagrammatic views, similar to Figures 1 and 2, but showing a different form of one-way clutch mechanism.

In all the views similar parts are designated by the same reference letters.

The embodiment represented in Figures 1 and 2 is most suitable in the case of a one way clutch mechanism involving a locked hub C and movable flange ring A. Between the parts A and C are provided curviform wedges B, which have one or both working faces $B^1$, $B^2$ formed according to logarithmic spirals, the surfaces $A^1$, $C^1$ of the flange ring A and of the hub C being analogously formed.

The principle of operation is as follows: When the flange ring A rotates in the direction of the arrow D, Fig. 1, it carries along wedges B, which at a certain speed and by centrifugal force, adhere to the flange ring and separate from the hub as shown in Fig. 1, thus rendering the mechanism silent and causing it to operate without losses. It is manifest that the flange ring A cannot possibly move in the direction of the arrow E, Fig. 2, because of the blocking or locking action of the wedges. The latter, no longer actuated by the centrifugal force, come in contact with the hub C, and become wedged between the flange ring and the hub as shown in Fig. 2.

In order to produce sufficient friction between B and C, material of various properties is available; also, the form of the contact surfaces may be altered by means of roughening, embossing, or corrugating. As shown in Figs. 1 and 2, the surface $C^1$ may be scalloped to provide curves of logarithmic spiral form. If desired the surfaces $B^2$ and $C^1$ may be given a wedge-like form in a plane normal to the axis of the members A and C.

Figures 3 and 4 show a form of one-way clutch mechanism having wedges B which operate by expanding against the flange ring A, as well as by pressing against the hub C; this arrangement is adapted for the case in which the hub C also rotates (e. g. motor vehicles).

When the speed of C exceeds that of A, the wedges B, as a result of centrifugal force, shift on the internal surface $A^1$ of flange A, and they leave the hub C free to rotate at a higher speed than the flange A. If A tends to accelerate on C, or C to lag behind A, the friction between A and B will carry the wedges until locking is effected. In this embodiment the members A and C move in the direction of the arrows F and G.

It will be appreciated that the mechanisms described above render possible very high braking torques with small weight and space.

If, in the arrangement of Figs. 3 and 4, the pressure exerted by the centrifugal force of the wedges, combined with their velocity, should entail considerable losses, it is possible to reduce the friction with available anti-friction means.

In Figures 3 and 4, one such embodiment is shown, by which the rubbing friction between the flange ring A and the wedges B is transformed into rolling friction through the interposition of small balls or rollers H located in housings I provided in the wedges B. Such housings or seats in the thin part of the wedge are deeper than the diameter of the rollers while in the thicker part of the wedge they are shallower than the diameter of the rollers to an extent sufficient to allow the rolling of the rollers on flange A. Under such conditions, it is obvious that the motion takes place in one direction (free motion) with rolling friction, and in the other direction (braking) with rubbing friction.

It will be understood that the invention is not limited to the details described and illustrated but changes may be made without departing from the scope of the appended claims.

I claim:

1. One-way clutch mechanism comprising coaxial members, wedges between said members, curved surfaces on said wedges, and correspondingly curved surfaces on said members, at least one set of said surfaces being defined by logarithmic spirals.

2. One-way clutch mechanism comprising coaxial inner and outer members, wedges between said members, a first set of correspondingly curved surfaces on the interior of said outer member and on one side of said wedges, and a second set of correspondingly curved surfaces on the exterior of said inner member and on said wedges, the surfaces of said first set being defined by logarithmic spirals.

3. One-way clutch mechanism comprising coaxial members, wedges between said members, a first set of correspondingly curved surfaces on the interior of said outer member and on one side of said wedges, and a second set of correspondingly curved surfaces on the exterior of said inner member and on the other side of said wedges, the surfaces of said second set being defined by logarithmic spirals.

4. One-way clutch mechanism comprising coaxial members, wedges between said members, curved surfaces on said members and said wedges, anti-friction members on one surface of said wedges, and grooves in said wedges receiving said anti-friction members and of varying depth in the direction of taper of the wedges.

5. A wedge having curved active surfaces, at least one of said surfaces being defined by a logarithmic spiral.

6. A wedge having a curved active surface defined by a logarithmic spiral, and also having another curved surface.

7. A wedge having curved active surfaces, one of said surfaces being formed with grooves of varying depth in the direction of taper of the wedge.

MARIO DE FALCO.